(12) United States Patent
Jagadeesan et al.

(10) Patent No.: US 10,409,705 B2
(45) Date of Patent: Sep. 10, 2019

(54) AUTOMATED CODE VERIFICATION AND MACHINE LEARNING IN SOFTWARE DEFINED NETWORKS

(71) Applicants: Lalita J. Jagadeesan, Naperville, IL (US); Veena B. Mendiratta, Oak Brook, IL (US)

(72) Inventors: Lalita J. Jagadeesan, Naperville, IL (US); Veena B. Mendiratta, Oak Brook, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 153 days.

(21) Appl. No.: 15/499,528

(22) Filed: Apr. 27, 2017

(65) Prior Publication Data

US 2018/0314619 A1    Nov. 1, 2018

(51) Int. Cl.

| | |
|---|---|
| G06F 11/00 | (2006.01) |
| G06F 11/36 | (2006.01) |
| G06N 5/04 | (2006.01) |
| G06N 20/00 | (2019.01) |
| G06F 8/00 | (2018.01) |
| G06F 9/445 | (2018.01) |
| H04L 12/701 | (2013.01) |
| H04L 12/703 | (2013.01) |

(Continued)

(52) U.S. Cl.
CPC ............ *G06F 11/3608* (2013.01); *G06F 8/00* (2013.01); *G06F 9/44589* (2013.01); *G06F 11/3616* (2013.01); *G06N 5/04* (2013.01); *G06N 20/00* (2019.01); *H04L 41/0866* (2013.01); *H04L 41/0893* (2013.01); *H04L 45/00* (2013.01); *H04L 45/28* (2013.01); *G06F 8/75* (2013.01)

(58) Field of Classification Search
CPC .. G06F 11/3608; G06F 11/3616; G06F 11/36; G06F 11/3604; G06F 11/3612; G06F 11/3668; G06F 11/3672; G06F 8/00; G06F 8/75; G06F 8/77; G06F 9/44589; G06N 5/04; G06N 5/042; G06N 5/046; G06N 5/048; G06N 99/005; H04L 41/0866; H04L 41/0893; H04L 41/0876; H04L 41/0886; H04L 45/00; H04L 45/28; H04L 45/02; H04L 45/08
USPC ................... 714/38.1, 41, 47.1, 48; 717/104, 717/124–135
See application file for complete search history.

(56) References Cited

U.S. PATENT DOCUMENTS

2016/0072769 A1\*    3/2016    Yakuwa ................ H04L 41/145
726/12

OTHER PUBLICATIONS

Godefroid, "Between Testing and Verification: Dynamic Software Model Checking", In Dependable Software Systems Engineering, 2016 (Year: 2016).\*

(Continued)

*Primary Examiner* — Anthony J Amoroso (57) ABSTRACT

A processor is configured to execute an event-driven program along a plurality of execution paths. Each of the plurality of execution paths is determined by randomly chosen outcomes at non-deterministic points along the plurality of execution paths. A memory is configured to store values of properties of the event-driven code in response to executing the event-driven program along the plurality of execution paths. The processor is also configured to infer normal ranges of the properties of the event-driven program based on the values stored in the memory.

20 Claims, 7 Drawing Sheets

(51) Int. Cl.
*H04L 12/24* (2006.01)
*G06F 8/75* (2018.01)

(56) References Cited

OTHER PUBLICATIONS

Wang, Wen, Wenbo He, Jinshu Su, and Yixin Chen. "Cupid: Congestion-free consistent data plane update in software defined networks." In Computer Communications, IEEE INFOCOM 2016—The 35th Annual IEEE International Conference on, pp. 1-9. IEEE, 2016. (Year: 2016).*

IntentReactiveForwarding.jav, <https://github:com/opennetworkinglab/onos-app-samples/blob/master/ifwd/src/main/lava/org/onosproject/ifwd/IntentReactiveForwarding:java>, Accessed Jul. 26, 2017, 4 pages.

The Onos project—Onlabs, <http://onosprojectorg/>, Accessed Jul. 26, 2017, 2 pages.

Mininet, <http://mininet:org/>, Accessed Jul. 26, 2017, 2 pages.

www.sdnctc.com, "ONOS Controller Performance Test Report", Jul. 4, 2016, 18 pages.

Baier, et al., "Preface to the special issue on Probabilistic Model Checking", Form Methods Syst Des, Aug. 17, 2013, 3 pages.

Ball, et al., "VeriCon: Towards Verifying Controller Programs in Software-Defined Networks", PLDI '14 Proceedings of the 35th ACM SIGPLAN Conference on Programming Language Design and Implementation, Jun. 9-11, 2014, 12 pages.

Canini, et al., "A NICE Way to Test OpenFlow Applications", Networked Systems Design and Implementation, 2012, 14 pages.

Clarke, et al., "Progress on the State Explosion Problem in Model Checking", Proceeding Informatics—10 Years Back. 10 Years Ahead, 2001, 19 pages.

Croft, et al., "Systematically Exploring the Behavior of Control Programs", 2015 USENIX Annual Technical Conference, Jul. 2015, 12 pages.

Fillieri, et al., "Reliability Analysis in Symbolic Pathfinder", Proceedings of the 2013 International Conference Software Engineering, May 18-26, 2013, 10 pages.

Godefroid, "Between Testing and Verification: Dynamic Software Model Checking", In Dependable Software Systems Engineering, 2016, 18 pages.

Godefroid, et al., "Dart: Directed automated random testing", Proceedings of the 2005 ACM SIGPLAN Conference on Programming Language Design and Implementation, Jun. 12-15, 2005, 11 pages.

Jagadeesan, et al., "Programming the Network: Application Software Faults in Software-Defined Networks", 2016 IEEE International Symposium on Software Reliability Engineering Workshops (ISSREW), Oct. 23-27, 2016, 7 pages.

Khurshid, et al., "VeriFlow: Verifying network-wide invariants in real time", Proceedings of the First Workshop on Hot Topics in Software Defined Networks, Aug. 13, 2012, 13 pages.

Kreutz, et al., "Software-Defined Networking: A Comprehensive Survey", Proceedings of the IEEE, 2015, 63 pages.

Lee, et al., "SHIELD: An Automated Framework for Static Analysis of SDN Applications", Proceedings of the 2016 ACM International Workshop on Security in Software Defined Networks & Network Function Virtualization, Mar. 11, 2016, 6 pages.

Lee, et al., "The Smaller, the Shrewder: A Simple Malicious Application Can Kill an Entire SDN Environment", Proceedings of the 2016 ACM International Workshop on Security in Software Defined Networks & Network Function Virtualization, Mar. 11, 2016, 6 pages.

Lindstrom, et al., "Model Checking Real Time Java Using Java PathFinder", Proceedings of the Third international conference on Automated Technology for Verification and Analysis, Oct. 4-7, 2005, 13 pages.

Majumdar, et al., "Kuai: A Model Checker for Software-defined Networks", Formal Methods in Computer-Aided Design (FMCAD), 2014, 8 pages.

Visser, et all, "Model Checking Programs", Automated Software Engineering, vol. 10, Issue 2, Apr. 2003, 9 pages.

Wang, et al., "Ckmeans.1d.dp: Optimal k-means Clustering in One Dimension by Dynamic Programming", R Journal, Dec. 2011, 5 pages.

Godefroid, "Between Testing and Verification: Dynamic Software Model Checking", NATO Science for Peace and Security Series—D: Information and Communication Security, vol. 45: Dependable Software Systems Engineering, 2016, 18 pages.

\* cited by examiner

AUTOMATED CODE VERIFICATION AND MACHINE LEARNING IN SOFTWARE DEFINED NETWORKS

BACKGROUND

The architecture of a software defined networking (SDN) network is divided into three logical planes: (1) an application plane that hosts network applications, (2) a control plane that implements instances of a distributed network operating system, (3) a data plane that includes hosts and switches. The control plane generates rules that are provided to the data plane, which uses the rules to determine how to route flows through the SDN network. For example, a network application in the application plane can request a connection between a source address and a destination address. An instance of the distributed network operating system in the control plane receives the request and generates a set of flow rules for routing the flow between the source and destination addresses. The control plane entity provides the set of flow rules to the hosts and switches in the data plane, where they are stored in flow tables that are used to route the flows.

Network applications can be dynamically deployed in real time in an operational SDN network, but deploying unreliable or insecure network applications poses significant risks to the SDN network. For example, event-driven applications such as a reactive application that forwards incoming connection requests from a source to a destination can crash an SDN network under high rates of incoming requests. The SDN network crash causes the SDN network to drop packets in existing flows and renders the SDN network unresponsive to new packets and connection requests. Event-driven applications can therefore compromise the reliability and performance of the SDN network, as well as compromising the security of the SDN network, e.g., by rendering the SDN network vulnerable to denial-of-service (DoS) attacks. Event-driven software executing in the control plane can present similar risks to the stability of the SDN network.

Model checking is conventionally used to verify code and detect bugs by examining all execution paths in the code up to a specified depth. For example, the code used to implement a network application can be represented as a tree including decision nodes that represent each branch point (e.g., an if-then-else statement or thread scheduling choices) in the execution of the code. The model checking algorithm executes all paths through the tree up to a depth that can be specified by the number of decision nodes. For example, model checking code such as NASA's Java Path Finder follows every execution path in a program using backtracking. The backtracking algorithm includes saving the complete state of the program at every non-deterministic point (such as branch points) and then recursively exploring all alternative choices at the non-deterministic points after the termination of each execution path.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Although conventional model checking is an effective technique for automated code verification there are a number of drawbacks to applying recursive backtracking to event-driven applications. First, detecting bugs or other errors in the code using conventional model checking requires comparing properties of the code (such as numbers of specific events) to predetermined thresholds. Conventional model checking cannot infer violated properties that reflect anomalous behavior of the code, nor is conventional model checking able to assess soft real-time properties, e.g., the relative values of properties of an application with respect to the behavior of other applications. Second, recursive backtracking requires saving the complete state at every non-deterministic point in the code, which leads to a state space explosion because the number of states that need to be stored increases exponentially with increasing depth of the execution paths explored by the model checking algorithm. For example, the total number of execution paths that must be explored by the recursive backtracking algorithm to reach a maximum depth of k for 1000 events is $k^{1000}$. Thus, verifying the behavior of an event-driven application, or event-driven software executing in the control plane, on long input sequences using conventional model checking algorithms requires an impractically large amount of memory.

At least in part to address the aforementioned drawbacks of conventional model checking algorithms, FIGS. 1-9 disclose embodiments of the system for verifying reliability, performance, and security of a program implemented in an SDN network by executing an event-driven application along a plurality of execution paths that include a plurality of non-deterministic points (such as branch or decision points). Properties of the event-driven application are determined for each of the plurality of execution paths in response to termination of the corresponding execution path, e.g., by reaching a predetermined depth in the event-driven application. Each execution path is determined by randomly choosing outcomes at the non-deterministic points from a distribution of possible outcomes. For example, the distribution of outcomes at a decision point can include equally weighted true and false values. For another example, the distribution of outcomes at a decision point can include differentially weighted true and false values. The differential weights are determined based on a priori knowledge of the outcomes, previous outcomes of the event-driven application, and the like. As used herein, the term "randomly" refers to choices that are made truly randomly and pseudorandom choices.

Identifiers of the execution paths are defined by the sequence of randomly chosen outcomes at each non-deterministic point. For example, an execution path that is determined by choosing a value of "true" at a first decision point, a value of "false" at a second decision point, and a value of "true" at a third decision point is assigned the identifier TFT. Normal ranges of the values of properties of the application are inferred from the properties generated along each of the plurality of execution paths. For example, for an event-driven application, a mean, a median, a mode, or another statistical combination of packet processing times can be tracked along the plurality of execution paths for anomaly detection purposes. Anomalous properties are determined by the application of change detection algorithms. For example, a bug can be detected by identifying an execution path for which the change detection algorithm detects a significant change in the packet processing time. The values of the outcomes indicated by the identifier of the anomalous execution path can then be used to identify the exact execution path through the code.

Figure 1:
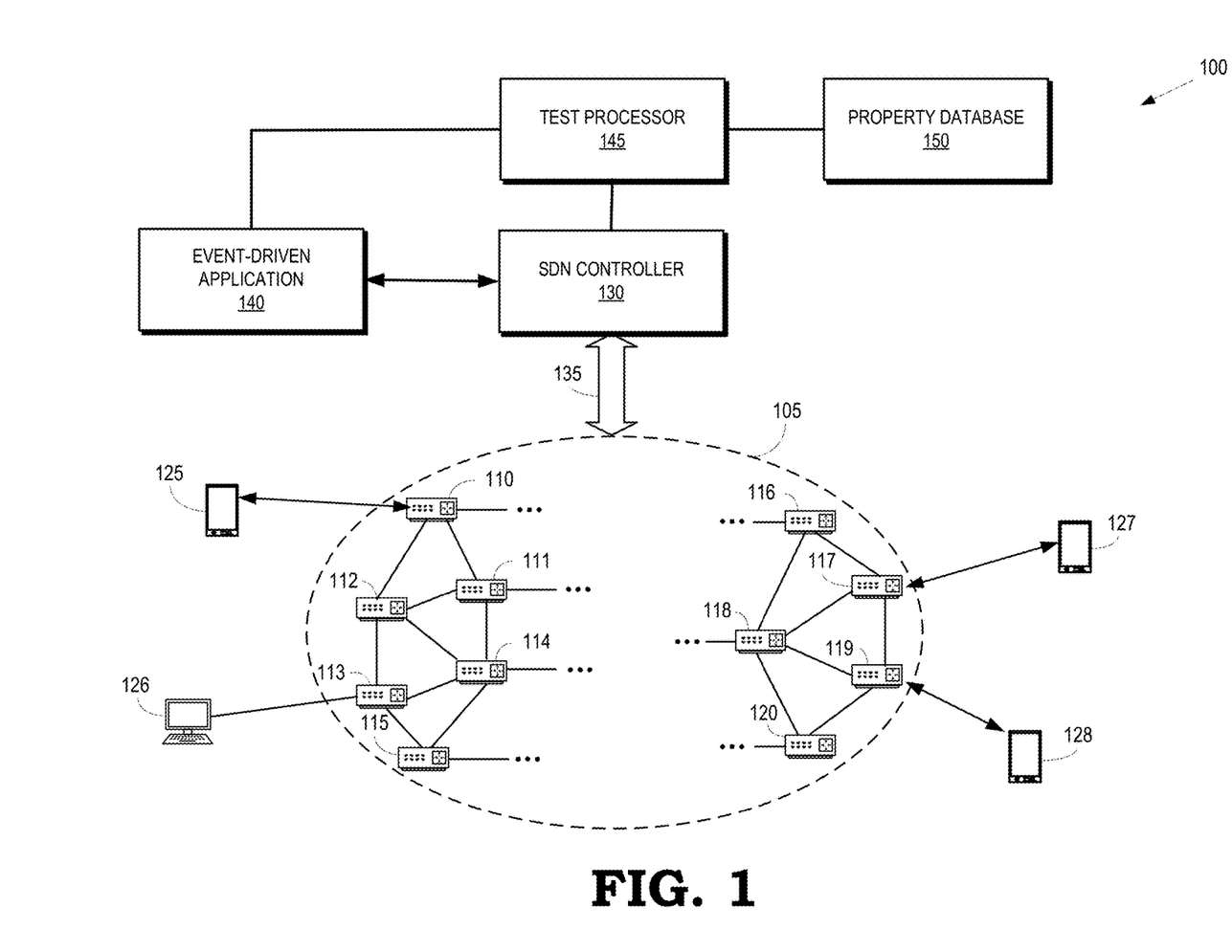
FIG. 1 is a block diagram of a communication system according to some embodiments.

FIG. 1 is a block diagram of a communication system 100 according to some embodiments. The communication system 100 includes a switch network 105 made up of a plurality of interconnected switches 110, 111, 112, 113, 114, 115, 116, 117, 118, 119, 120 (collectively referred to herein as "the switches 110-120"). Some embodiments of the switches 110-120 provide wired or wireless connectivity to user equipment 125, 126, 127, 128 (collectively referred to as "user equipment 125-128"). For example, the switch 110 can be a wireless switch that can provide wireless connectivity to user equipment 125 and the switch 113 can be a wired switch that can provide wired connectivity to user equipment 126. Examples of the user equipment 125-128 include relatively mobile devices such as cell phones, smart phones, tablet computers, laptops, and the like, as well as relatively immobile devices such as desktop computers. Examples of the user equipment 125-128 also include devices such as sensors that are configured for machine-to-machine (M2M) communication over the switch network 105.

Some embodiments of the communication system 100 implement software defined networking (SDN). As used herein, the term "software defined networking" refers to a network in which the control plane functionality for a plurality of switches is separated from the data plane functionality. As used herein, the term "control plane" refers to the portion of the architecture that configures a map of the network, which is represented in one or more flow tables that define what each switch is to do with incoming packets. For example, control plane functionality configures a flow table that defines outgoing ports for different incoming packets, filters of incoming packets, and the like. As used herein, the term "data plane" refers to the portion of the architecture that receives and processes packets as they arrive at the switch according to instructions provided by the control plane. For example, data plane functionality uses information stored in the flow table by the control plane functionality to decide whether to forward an incoming packet to one or more other switches via one or more ports or to filter the incoming packet. The data plane can also be referred to as the forwarding plane, the transport plane, the data bearer plane, or other descriptive terms.

A controller 130 includes a control plane system that implements control plane functionality for the switch network 105. The controller 130 exchanges information with the switches 110-120 in the switch network 105. Some embodiments of the controller 130 are referred to as an SDN controller 130. In the interest of clarity, the wired or wireless connections between the SDN controller 130 and the switches 110-120 in the switch network 105 are collectively indicated by the double-headed arrow 135. Some embodiments of the communication system 100 include other switch networks that are interconnected with the switch network 105 and which have their own SDN controllers that can communicate with the SDN controller 130 shown in FIG. 1.

The SDN controller 130 determines the map for different routes through the switch network 105 and provides the routing information to the switches 110-120, e.g., in the form of information that can be used to populate flow tables in the switches 110-120. Some embodiments of the SDN controller 130 provide the network map information to some or all of the switches 110-120 in response to user equipment 125-128 initiating communication with other user equipment 125-128. For example, the user equipment 125 can provide messaging to establish a communication link with user equipment 128. The control plane system in the SDN controller 130 then determines one or more routes through the switches 110-120 and provides routing information to a relevant subset of the switches 110-120. For example, the control plane system can determine that an optimal route from the user equipment 125 to the user equipment 128 includes the switch 110, the switch 111, the switch 118, and the switch 119. The control plane system can therefore provide routing information to populate the flow tables in the switches 110, 111, 118, 119 so that incoming packets from the user equipment 125 that are destined for the user equipment 128 are forwarded along the correct path through the switches 110-120. Some embodiments of the SDN controller 130 pre-provision routing information to the flow tables in the switches 110-120.

The control plane system in the SDN controller 130 is also used to configure data plane systems that implement data plane functionality in the switches 110-120 to gather information associated with users of the user equipment 125-128. Some embodiments of the control plane systems provide information to configure entries in the flow tables to monitor, collect, or store information associated with user flows for the user equipment 125-128. For example, in response to the user equipment 125 initiating a user flow with the switch 110, the control plane system can select the switch 110 to gather information associated with user flows for the user equipment 125, such as packet counts, byte counts, or elapsed time associated with the user flow. The control plane system then provides information to configure the data plane system in the switch 110, e.g., by programming entries in a flow table together with the requested information. The control plane system can also configure the data plane system in the switch 110 to autonomously report the data at specified time intervals or when a specified usage threshold has been exceeded.

The communication system 100 also includes one or more event-driven applications 140 that utilize the switch network 105 to provide services to one or more of the user equipment 125-128. As used herein, the term "event-driven" refers to applications that perform operations in response to events that are detected at the data plane (e.g., a packet arriving at one of the switches 110-120). The detected events are subsequently signaled to the control plane (e.g., the SDN controller 130) and then signaled to the event-driven application 140. For example, the event-driven application ifwd intent is a reactive forwarding application that creates and submits an "intent" request to the SDN controller 130 in response to receiving signaling from a control plane entity indicating that a packet has been received by a data plane entity, such as a packet event received by one of the switches 110-120 for which the switch does not contain a corresponding flow rule. The switch then sends a PACKET_IN event to the control plane. The intent request indicates a request for a connection between a source address and a destination address specified in the PACKET_IN event. The SDN controller 130 can store the intent request and create a set of flow rules corresponding to the source and destination specified in the intent request. The set of flow rules is transmitted to the appropriate data plane switches 110-120, which use the set of flow rules to configure the requested path between the source and destination addresses.

In some embodiments, the event-driven capability of the event-driven application 140 is governed by a "process" function that receives events, performs checks on the received packet and on aspects of the controller state, and calls SDN functions to execute one or more actions. Execution of the event-driven application 140 on the received event terminates when the process function returns. An example of a code fragment of the process function is:

```
Public static void Process (PacketContext context) {
...
    if (srcId.toString( ).contains("00:00:00:00:00:01")){
        numcycles=1000;
    } else {
        numcycles=0;
    }
    HostToHostIntentBuilder partialIntent=HostToHostIntent.builder( )
        .appId(appId)
        .one(srcId)
        .two(dstId)
        .selector(selector)
        .treatment(treatment)
    for (int i = 1; i < numcycles; i++) {
        ikey = newKey(srcId, dstId, appId, i);
        intentService.submit(partialIntent.key(ikey).priority(10+i).build( ));
    }
...
```

Reliability, performance, and security of the process function requires that the process function be guaranteed to terminate "quickly" because slow executions of a process function cause network packets to timeout, resulting in the network dropping packets and requested flows not being established. Slow execution can also cause a build-up of queues of events waiting to be sent to the event-driven application 140. Furthermore, the process function should not submit intent requests at a higher rate for a sustained period of time than the execution rate of the intent requests at the control plane 130. Interactions between the event-driven application 140 and the intent requests stored by the SDN controller 130 are asynchronous and disparate submission/execution rates can lead to the build-up of intent requests at the SDN controller 130. The execution time of the process and the intent request rate can be referred to as a "soft" properties of the event-driven application 140 because the actual value of a measure of the speed of execution of the event-driven application 140 may be less relevant to evaluating reliability, performance, or security than relative values of the measure for different instances of the event-driven application 140.

The communication system 100 implements a test processor 145 that is used to verify reliability, performance, and security of the event-driven application 140. Some embodiments of the test processor 145 can also be used to verify reliability, performance, and security of event-driven processes implemented in the SDN controller 130. However, in the interest of clarity, the operation of the test processor 145 is described herein in the context of testing the event-driven application 140. The same techniques can be used to test event-driven processes in other entities including the SDN controller 130. Furthermore, although the event-driven application 140 is depicted in FIG. 1 as being connected to the SDN controller 130 and the other entities in the communication system 100, testing of the event-driven application 140 by the test processor 145 does not require that the event-driven application 140 be implemented in the communication system 100. For example, the event-driven application 140 can be implemented in the test processor 145, another processor, or another combination of processors for testing purposes and then, if the testing is successful, the event-driven application can be installed in an SDN network.

The test processor 145 can be configured to compare measured properties of instances of the event-driven application 140 against fixed threshold values of the properties. For example, the test processor 145 can compare a threshold value of a packet processing time of an instance of the event-driven application 140 to actual packet processing times during execution of the instance. For another example, the test processor 145 can compare a threshold value of a number of submitted intent requests to actual intent requests submitted during execution of the instance. These comparisons can be used to detect faulty or malicious variants of the event-driven application 140. For example, the program used to implement the process function described above includes code that launches a denial-of-service (DoS) attack in response to receiving a packet from a source identifier (srcId) of 00:00:00:00:00:01. For another example, the following code fragment of a program used to implement the processing function generates a faulty delay of 100 milliseconds (ms) for packets received from the source identifier 00:00:00:00:00:02:

```
Public static void Process (PacketContext context) {
...
    if (srcId.toString( ).contains("00:00:00:00:00:02")){
        dosomethingfor100ms( );
    }
...
```

The test processor 145 executes instances of the event-driven application 140 and compares the properties (e.g., packet processing time or intent submission rate) of the executed instances to detect faulty or malicious variants of the event-driven application 140. The results for these example instances of the event-driven application 140 are summarized in Table 1. However, predetermined thresholds such as a 50 ms packet processing time or less than 500 intent submissions are not typically useful for assessing soft properties of the event-driven application 140 because it may not be possible to define threshold values of the soft properties prior to execution of the event-driven application 140. Moreover, testing of the event-driven application 140 can generate a state space explosion because the number of states that need to be explored and stored increases exponentially with increasing depth of the execution paths explored by the model checking algorithm and an increasing number of events.

TABLE 1

| Application | Packet processing time ≤50 ms | No more than 500 intents submitted |
|---|---|---|
| ifwd | Satisfied | Satisfied |
| Faulty Wait | Violated | Satisfied |
| Malicious DoS | Violated | Violated |

To address these drawbacks in the conventional model checking algorithms, the test processor 145 is configured to verify the reliability, performance, and security of the event-driven application 140 by executing the event-driven application 140 along a plurality of execution paths that include a plurality of non-deterministic points (such as branch or decision points). The test processor 145 then determines properties of the event-driven application 140 (such as packet processing times, intent submission rates, and the like) for each of the execution paths in response to termination of the corresponding execution path, e.g., by reaching a predetermined depth in the event-driven application 140. The test processor 145 determines each of the execution paths by randomly choosing outcomes at the non-deterministic points along the execution paths. The test processor 145 creates identifiers for each of the execution paths based on the randomly chosen outcomes, e.g., by concatenating values representative of the randomly chosen outcomes for the corresponding execution path.

The test processor 145 stores values of the properties of the event-driven application 140 and the corresponding path identifiers in a property database 150 in response to executing the event-driven application 140 along the execution paths. The information stored in the property database 150 is unlabeled data. As used herein, the phrase "unlabeled" indicates that a classification or categorization is not included in the stored values, e.g., the data is not labeled as "normal" or "anomalous." Thus, the unlabeled data includes no indication of anomalous events or anomalous execution paths. The property database 150 can be implemented in a memory such as a random access memory (RAM).

The test processor 145 performs unsupervised machine learning on the path identifiers and the stored values of the properties to infer normal ranges of the properties of the event-driven application 140 and detect potential anomalies that indicate violation of reliability, performance, or security properties. For example, the test processor 145 can determine a mean, a median, a mode, or another statistical combination of the stored values that indicates normal ranges of the properties. The test processor 145 can then detect anomalous execution paths by comparison with the inferred normal ranges of the properties. As used herein, the term "anomaly detection" refers to the identification of items, events or observations which do not conform to an expected pattern or other items in a dataset. Anomalies are also referred to as outliers, novelties, noise, deviations and exceptions. Anomalies do not necessarily satisfy the common statistical definition of an outlier as a rare object, and many outlier detection methods (in particular unsupervised methods) fail on data that includes anomalies that are not rare in the data set. Unsupervised anomaly detection techniques detect anomalies in an unlabeled test data set (e.g., the values of the properties stored in the property database 150) under the assumption that the majority of the instances in the data set are normal by looking for instances that seem to fit least to the remainder of the data set.

Figure 2:
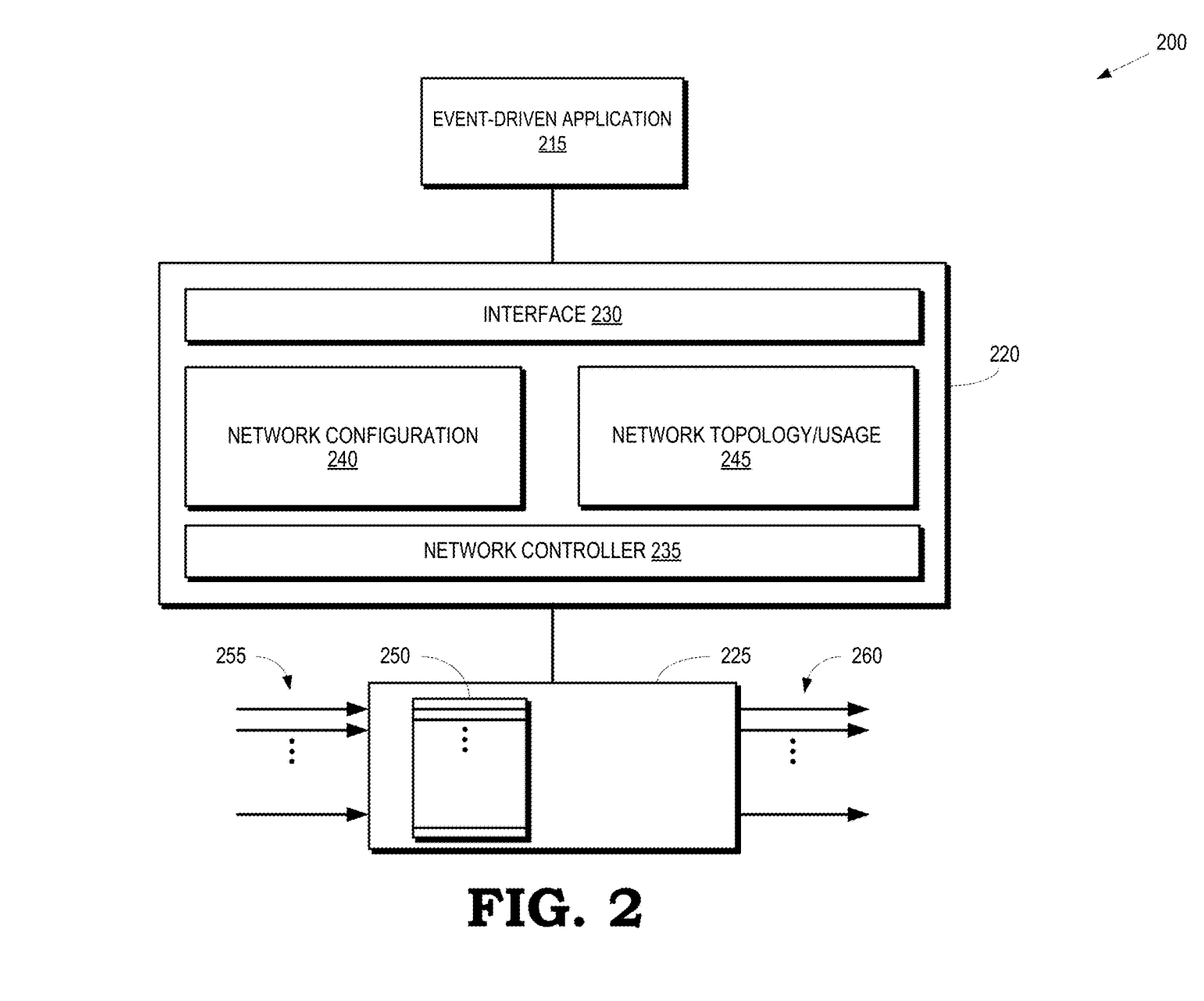
FIG. 2 is a block diagram of a portion of a communication system according to some embodiments.

FIG. 2 is a block diagram of a portion of a communication system 200 according to some embodiments. The portion of the communication system 200 includes an event-driven application 215, an SDN controller 220, and a switch 225, which are used to implement some embodiments of the event-driven application 140, the SDN controller 130, and one of the switches 110-120 shown in FIG. 1. Control plane functionality is consolidated in the SDN controller 220 and data plane functionality is implemented in the switch 225. As discussed herein, the reliability, performance, and security of the event-driven application 215 is determined using model checking and unsupervised machine learning on an unlabeled data set that is formed based on values of properties collected during execution of the event-driven application 215 along execution paths determined by randomly chosen outcomes at non-deterministic points along the execution path. Although FIG. 2 illustrates the interconnections between the event-driven application 215, the SDN controller 220, and the switch 225, the event-driven application 215 does not need to be connected to the SDN controller 220 to perform some embodiments of the model checking and unsupervised machine learning disclosed herein. Automated code verification based on model checking and unsupervised machine learning can also be performed on programs executing on some embodiments of the SDN controller 220.

The SDN controller 220 includes an interface 230 for communication between the event-driven application 215 and the SDN controller 220. The SDN controller 220 also includes a network controller 235 that is used to provide control information to switch 225 and to receive statistics or resource usage alerts from the switch 225. The SDN controller 220 also includes network configuration functionality 240 that is used to implement network configuration policies or apply network configuration templates. The SDN controller 220 also includes network topology/usage functionality 245 that is used to configure or modify the topology of the switch network that includes the switch 225 and monitor resource utilization in the switch network. The network controller 235, the network configuration functionality 240, or the network topology/usage functionality can be part of the control plane functionality of the SDN controller 220.

The switch 225 includes a flow table 250 that includes one or more entries that can be programmed to indicate how incoming packets are to be processed, filtered, or potentially forwarded. Entries in the flow table 250 can be programmed to gather information related to the user flows and provide the information to the SDN controller 220. Each entry in the flow table 250 corresponds to one of the incoming user flows 255 and corresponds to one or more of the outgoing user flows 260. For example, an entry in the flow table 250 can be programmed to forward packets from an incoming user flow 255 to an outgoing port corresponding to an outgoing user flow 260. For another example, an entry of the flow table 250 can be programmed to filter packets or gate one of the incoming user flows 255 so that the filtered or gated packets are not provided to an outgoing port.

The SDN controller 220 programs or configure entries in the flow table 250 based on information provided by the application 215. For example, the event-driven application 215 can store state information or metadata associated with the user flows. The state information or metadata may include information identifying an application associated with the user flow, a subscriber or user associated with the user flow, a quality-of-service (QoS) for the user flow, flow matching criteria to identify user flows, and the like. In response to the SDN controller 220 requesting information to configure an entry in the flow table 250, the event-driven application 215 uses the flow matching criteria to identify the user flow and provide user flow configuration information such as authorization to allow the user flow to transmit or receive data using the switch 225, parameters of a flow filter, or one or more thresholds for packet counts, byte counts, or an elapsed time for the user flow. The SDN controller 220 can then provide signaling to the switch 225 so that the switch 225 can program an entry in the flow table 250 to gather information related to the user flows 255, 260, authorize the user flow to consume resources up to one or more of the threshold values, and provide the gathered information to the SDN controller 220 autonomously or at specified time intervals. For example, the switch 225 may periodically provide reports to the SDN controller 220 with a periodicity that is defined by the SDN controller 220.

Once entries in the flow table 250 have been configured, the entries can be used to filter packets in the incoming user flows 255, forward packets from the incoming user flows 255 to the outgoing user flows 260, gather information for the user flows 255, 260, provide the information to the SDN controller 220, and the like. Some embodiments of the switch 225 may autonomously and periodically report statistics from the entries in the flow table 250 to the SDN controller 220. Some embodiments of the switch 225 may also provide resource usage alerts in response to resource usage approaching or exceeding a corresponding threshold. For example, a resource usage alert may be provided to the SDN controller 220 in response to a byte count associated with an incoming user flow 255 equaling or exceeding a byte count threshold. The switch 225 may gate the incoming user flow 255 in response to the byte count exceeding the byte count threshold and stop forwarding outgoing packets until further authorization is received from the SDN controller 220. Alternatively, the switch 225 may continue to forward packets until the SDN controller 220 sends the switch 225 instructions to stop forwarding outgoing packets because the SDN controller 220, after interacting with the event-driven application 215 has determined that further data transmission is not authorized.

Figure 3:
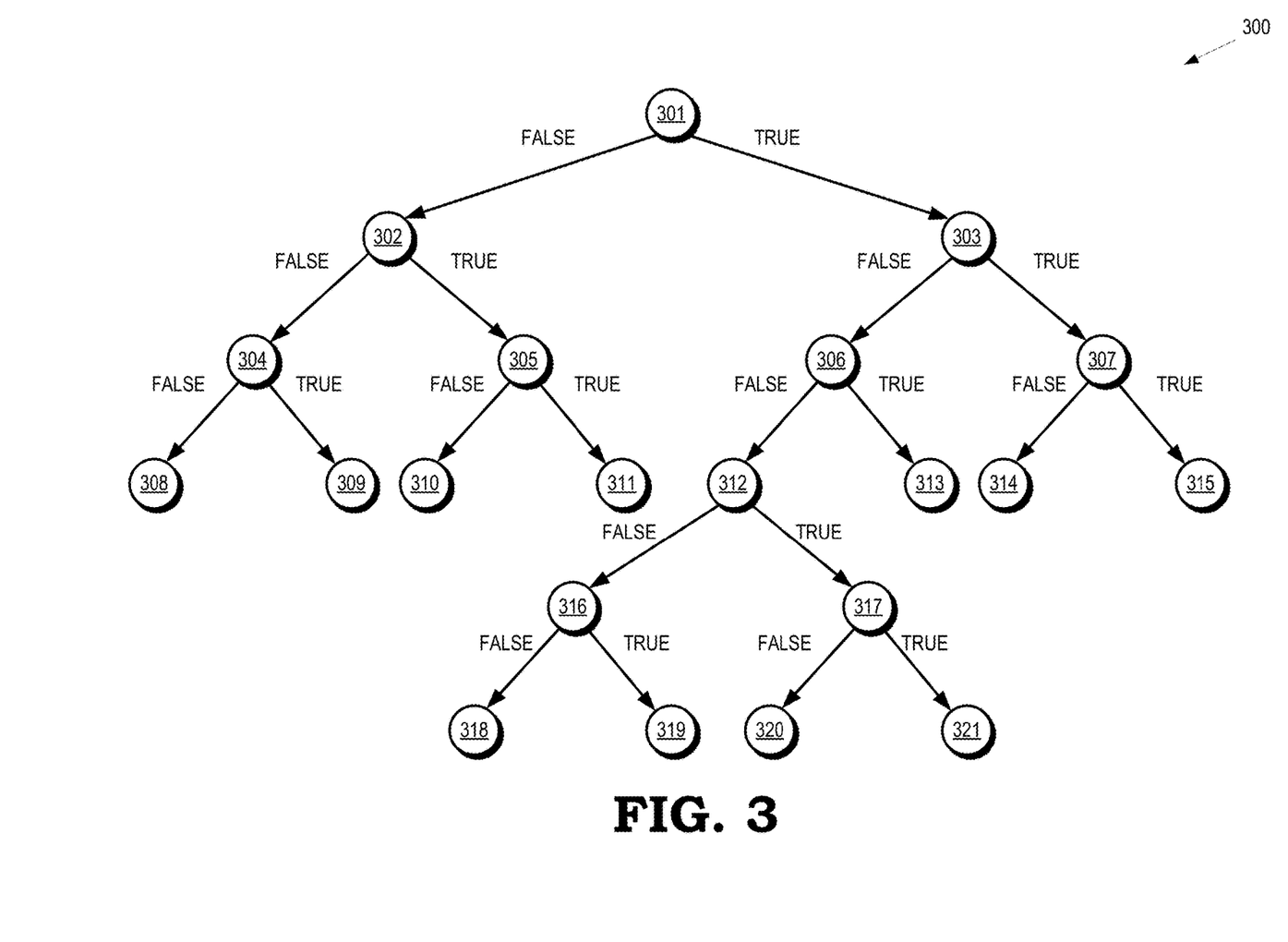
FIG. 3 illustrates a tree representation of a program that can be executed by an event-driven application in an SDN network according to some embodiments.

FIG. 3 illustrates a tree representation of a program 300 that can be executed by an event-driven application in an SDN network according to some embodiments. The program 300 is implemented in some embodiments of the event-driven application 140 shown in FIG. 1 and the event-driven application 215 shown in FIG. 2. The program 300 can also be implemented in some embodiments of the SDN controller 130 shown in FIG. 1, the SDN controller 220 shown in FIG. 2, and in other entities in the communication system 100 shown in FIG. 1 or the communication system 200 shown in FIG. 2.

The tree representation of the program 300 includes non-deterministic nodes such as branch points 301, 302, 303, 304, 305, 306, 307, 308, 309, 310, 311, 312, 313, 314, 315, 316, 317, 318, 319, 320, 321, which are collectively referred to herein as "the branch points 301-321." An outcome of each of the branch points 301-321 is determined by evaluating one or more conditions indicated in a portion of the program 300 represented by the corresponding node. In the illustrated embodiment, the outcomes of each of the branch points 301-321 are either "True" or "False," depending on whether an evaluation of the condition at the corresponding branch point 301-321 returns a value of True or False. The execution path of a particular instance of the program 300 is therefore determined by the outcomes at a subset of the branch points 301-321 that are encountered during execution of the instance of the program. For example, one execution path of an instance of the program 300 can include node 301, node 303, node 307, and the node 315 if the evaluation of the conditions that the nodes 301, 303, 307 all return values of True.

A test processor such as the test processor 145 shown in FIG. 1 executes instances of the program 300 along execution paths that are determined by randomly choosing outcomes at the branch points 301-321, instead of evaluating the actual condition that is encoded at the corresponding branch point 301-321. Some embodiments of the test processor randomly choose outcomes from an equally weighted distribution of outcomes, e.g., the outcomes True and False are selected with equal probability at each of the branch points 301-321. Some embodiments of the test processor randomly choose outcomes from a differentially weighted distribution of outcomes, e.g., the outcomes True and False are selected with different probabilities at each of the branch points 301-321. The differential weights for the possible outcomes can be determined based on a priori knowledge of the outcomes or previous outcomes at the branch points 301-321 during previous executions of the event-driven program.

The test processor executes the instances of the program 300 until a stopping condition is satisfied. For example, the branch point 308 may be the last branch point in the program 300, in which case the test processor can terminate execution of an instance of the program 300 when it reaches the branch point 308. Some embodiments of the test processor are configured to execute instances of the program 300 to a predetermined depth, which is evaluated in terms of a number of branch points that have been encountered along the execution path. For example, if the predetermined depth is set to five, the test processor can terminate execution of an instance of the program 300 when it reaches the branch point 318 because the instance of the program 300 has encountered five branch points along its execution path.

In response to terminating execution of an instance of the program 300, the test processor collects or determines values of properties of the instance along the execution path. The properties can include packet processing times, intent submission rates, and the like. The properties can be collected by reading times represented by clocks, reading values of registers that are used to count intent submissions, and the like. The test processor also determines an identifier of the execution path of the instance based on the randomly chosen outcomes at each node in the subset of the branch points 301-321 along the execution path. Some embodiments of the test processor determine the identifier by concatenating values representative of the randomly chosen outcomes. For example, a path identifier of an execution path from the node 301 to the node 313 can be written as TFT and a path identifier of an execution path from the node 301 to the node 320 can be written as TFFTF. The test processor is configured to repeat this process for multiple instances of the program 300 to gather samples of the values of the properties for randomly chosen execution paths. For example, the program 300 can be executed 1000 times to generate 1000 samples of values of the properties of the program 300. Each sample is identified by its corresponding path identifier. Since the outcomes are randomly chosen, some samples may share the same path identifier.

The test processor can infer information that characterizes the properties of the program 300 based on the values of the properties in the samples. For example, the test processor can infer a mean, a median, a minimum, and a maximum packet processing (PP) time using the samples collected for the randomly chosen execution paths. Table 2 illustrates values collected for an example event driven application such as the ifwd application discussed herein.

TABLE 2

| Path id | Mean PP | Median PP | Max PP | Min PP |
|---------|---------|-----------|--------|--------|
| FFFFF   | 1.090   | 0.733     | 7.825  | 0.333  |
| FFFFTF  | 0.968   | 0.667     | 3.898  | 0.317  |
| FFFFTT  | 1.291   | 0.978     | 5.617  | 0.445  |
| FFFTF   | 1.077   | 0.800     | 4.355  | 0.364  |
| FFFTT   | 0.600   | 0.578     | 1.788  | 0.253  |
| FFTF    | .0332   | 0.222     | 2.903  | 0.080  |
| FFTT    | 0.294   | 0.288     | 0.677  | 0.108  |
| FT      | 0.093   | 0.080     | 1.352  | 0.032  |
| T       | 0.008   | 0.007     | 0.134  | 0.002  |

The stored information (e.g., information stored in the property database 150) does not include an entire history of the testing process, as is required when using recursive backtracking in conventional model checking. Thus, the amount of information stored increases linearly with depth in the tree representation and the number of events, instead of increasing exponentially as occurs in recursive backtracking.

Figure 4:
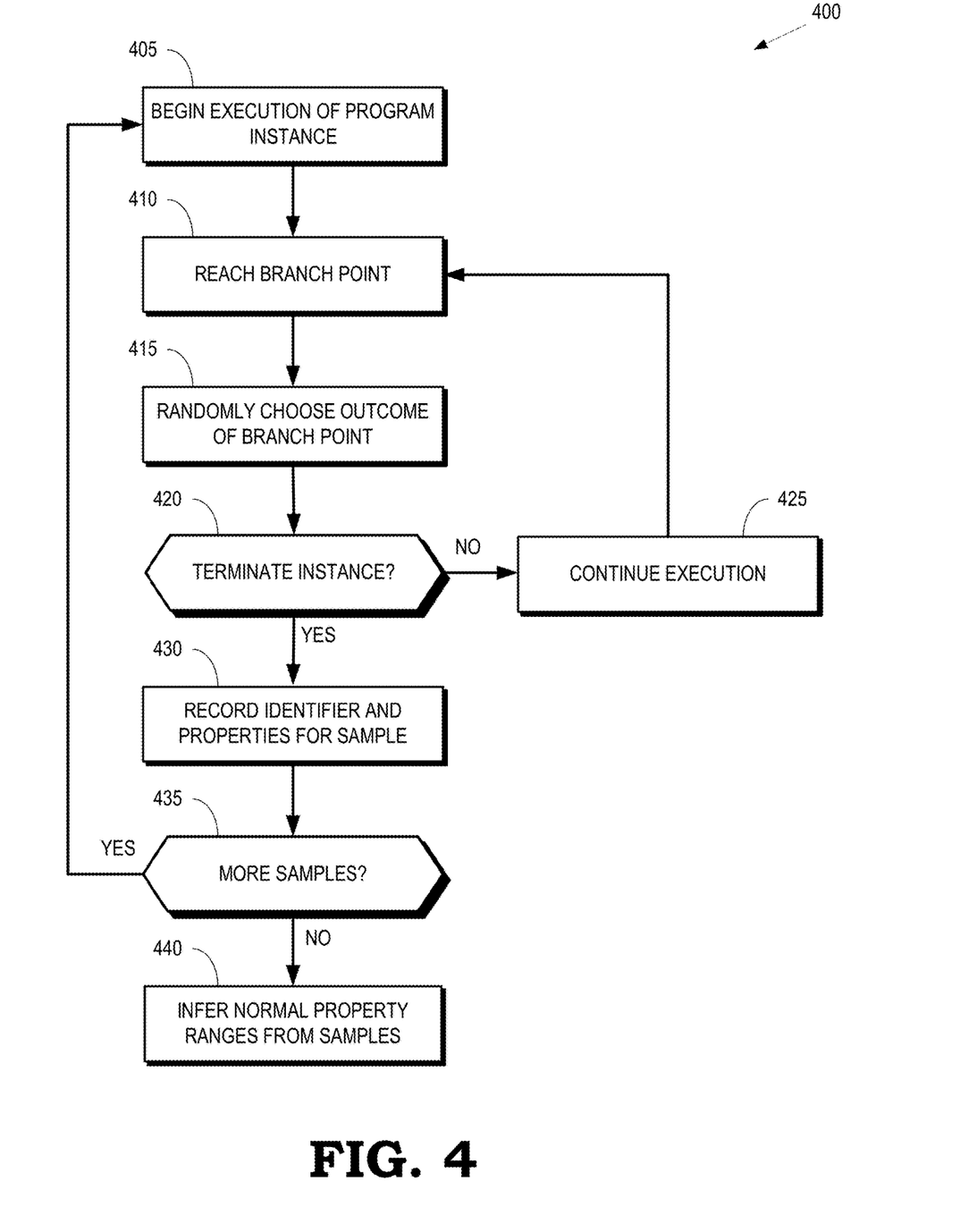
FIG. 4 is a flow diagram of a method of collecting samples of properties of the program executed along randomly chosen execution paths according to some embodiments.

FIG. 4 is a flow diagram of a method 400 of collecting samples of properties of the program executed along randomly chosen execution paths according to some embodiments. The method 400 is implemented in some embodiments of the test processor 145 shown in FIG. 1.

At block 405, a test processor initiates execution of an instance of a program implemented in an event-driven application such as the event-driven application 140 shown in FIG. 1. The instance of the program can execute on the test processor or on another processor. Initiating execution of the instance of the program can include processes such as initiating timers or clocks, initiating counters, setting register values, and the like. For example, initiating execution of the instance can include starting a clock to measure a packet processing time or initializing a value of an intent submission counter to zero. The instance continues to execute until it reaches a branch point at block 410 and the method 400 flows to block 415.

At block 415, an outcome at the branch point is randomly chosen. The outcome can be randomly chosen from an equally weighted distribution of outcomes or from a differentially weighted distribution of outcomes, as discussed herein. The instance continues to execute and the method 400 flows to decision block 420.

At decision block 420, the test processor determines whether the instance is to be terminated. For example, the instance can be terminated in response to reaching the end of the execution path of the program that is under test. For another example, the instance can be terminated in response to the test processor determining that the method 400 has reached a predetermined depth in the program, as indicated by a number of branch points that have been encountered along the current execution path. If the instance is not to be terminated, the method 400 continues execution of the instance at block 425 until the instance reaches a branch point at block 410. If the instance is to be terminated, the method 400 flows to block 430.

At block 430, the test processor records an identifier for the sample produced by executing the instance along the current execution path. For example, the identifier can be generated by concatenating values representative of the randomly chosen outcomes at the branch points along the current execution path. The test processor also records properties for the sample, such as a packet processing time, an intent submission rate, and the like. The identifier and the properties for the sample are stored in a memory, such as the property database 150 shown in FIG. 1.

At decision block 435, the test processor determines whether there are more samples to be acquired. If so, the method 400 flows to block 405. If not, the method 400 flows to block 440.

At block 440, the test processor infers characteristics of the properties of the program based on the acquired samples. For example, the test processor can perform unsupervised machine learning on the path identifiers and the properties of each of the samples stored in the memory to establish normal ranges of the properties. The test processor can then identify anomalous execution paths based on the inferred characteristics of the properties.

Figure 5:
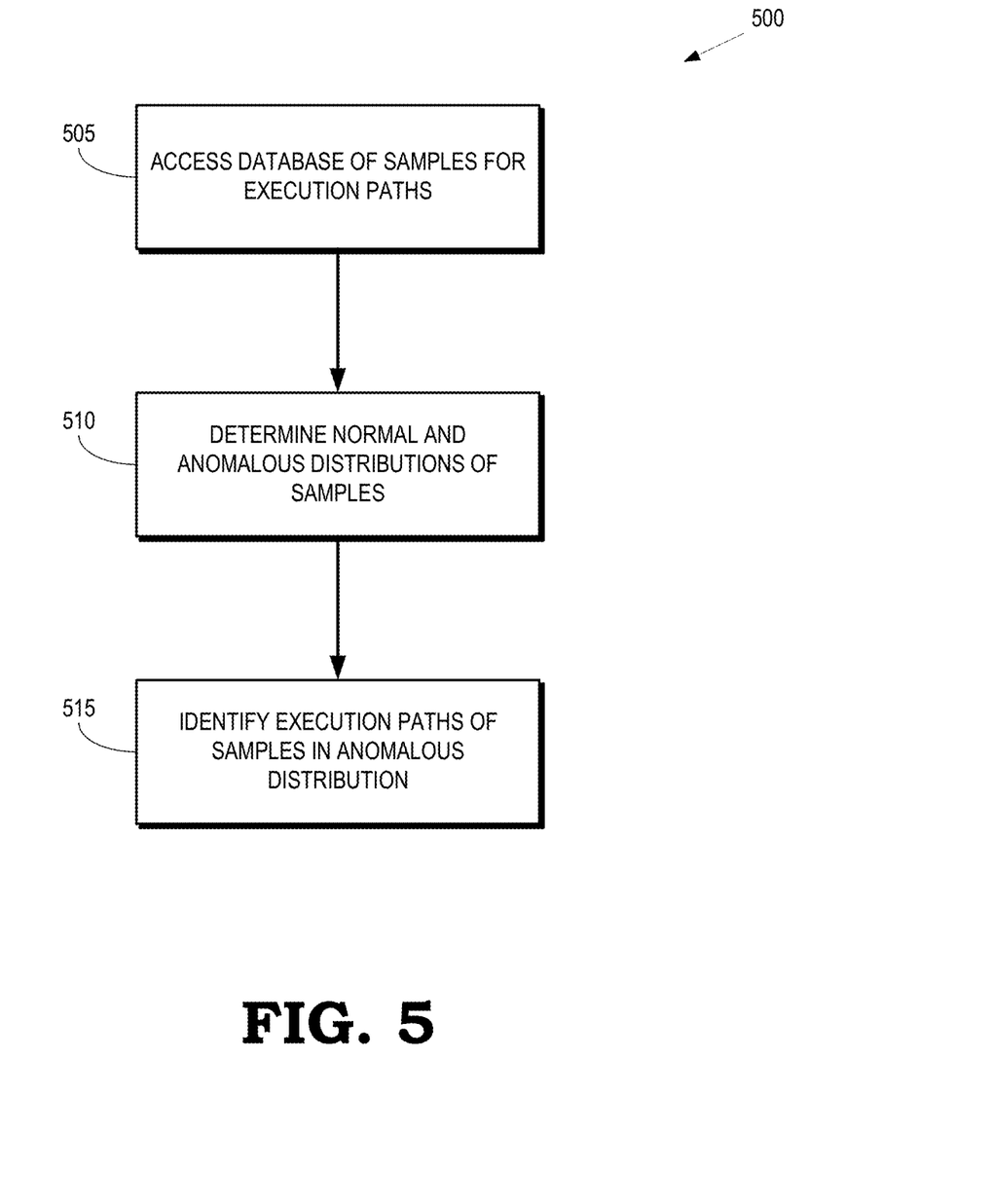
FIG. 5 is a flow diagram of a method for identifying an anomalous execution path according to some embodiments.

FIG. 5 is a flow diagram of a method 500 for identifying an anomalous execution path according to some embodiments. The method 500 is implemented in some embodiments of the test processor 145 shown in FIG. 1.

At block 505, the test processor accesses a database of samples for execution paths of different instances of a program, such as a program used to implement an event-driven application. The samples include path identifiers and values of properties for the different execution paths. As discussed herein, the path identifiers are generated based on values that represent randomly chosen outcomes of non-deterministic points along the execution paths.

At block 510, the test processor determines distributions of samples in the database of samples. Some embodiments of the test processor use a clustering algorithm to determine the distributions of the samples. For example, the test processor can determine a first distribution of samples that is characterized by a first range of properties. The test processor can also determine a second distribution of samples that is characterized by a second range of properties. The test processor then determines that the first distribution of samples includes a majority of the samples in the database, in which case the test processor identifies the first distribution of samples as a set of normal samples and the first range of properties as a normal range of properties. The test processor identifies the second distribution of samples, which includes a minority of the samples in the database, as an anomalous distribution that is characterized by an anomalous range of properties. In some cases, the test processor identifies more than two distributions of samples. The test processor may then identify more than two normal distributions, more than two anomalous distributions, or both. Furthermore, the test processor may not identify any anomalous distribution if the database of samples does not include samples of anomalous execution paths.

At block 515, the test processor identifies execution paths of the samples in the anomalous distribution. For example, if the anomalous distribution includes a sample including a path identifier and properties of an anomalous execution path, the test processor accesses the path identifier of the anomalous execution path. The path identifier is formed using information indicating randomly chosen outcomes of non-deterministic points in the program. The path identifier can therefore be used to exactly define the anomalous execution path taken by the instance of the program that produced the anomalous sample. The fault or malicious alteration in the program can be identified using the known anomalous execution path.

Figure 6:
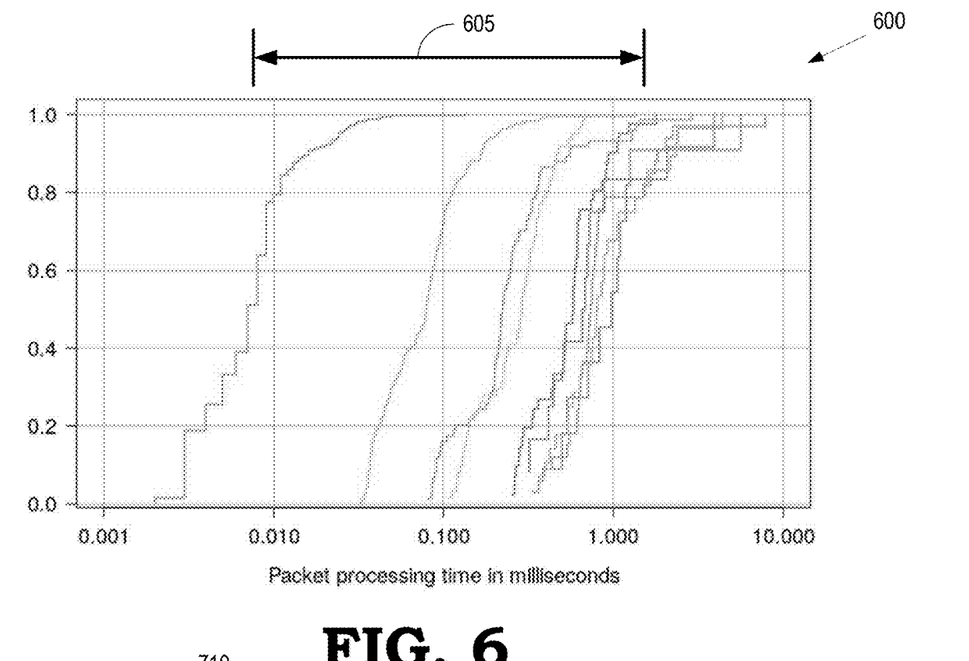
FIG. 6 is a plot of cumulative distribution functions (CDFs) of packet processing times for instances of an event-driven application along different execution paths according to some embodiments.

FIG. 6 is a plot 600 of cumulative distribution functions (CDFs) of packet processing times for instances of an event-driven application along different execution paths according to some embodiments. The vertical axis of the plot 600 represents a value of the CDF and the horizontal axis indicates the packet processing time in milliseconds (ms). The curve 605 represents the CDF of the packet processing time along one execution path. The curve 605 reaches a value of approximately one at a value of the packet processing time equal to 0.1 ms, indicating that substantially all of the instances of the event-driven application that executed along this execution path processed packets within 0.1 ms. The remaining curves (not indicated by individual reference numerals in the interest of clarity) represent the CDF of the packet processing time along other execution paths. The curves are considered part of a single, normal distribution that is characterized by a normal range 605 of packet processing times.

Figure 7:
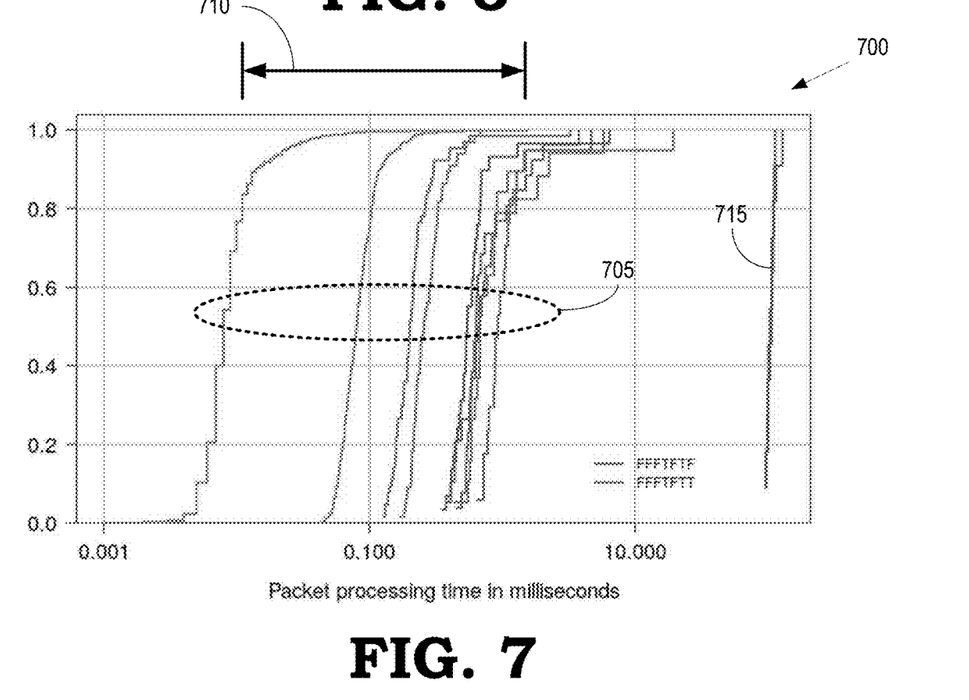
FIG. 7 is a plot of cumulative distribution functions (CDFs) of packet processing times for instances of an event-driven application that include an anomalous execution path according to some embodiments.

FIG. 7 is a plot 700 of cumulative distribution functions (CDFs) of packet processing times for instances of an event-driven application that include an anomalous execution path according to some embodiments. The vertical axis of the plot 700 represents a value of the CDF and the horizontal axis indicates the packet processing time in milliseconds (ms). The curves encompassed by the ellipse 705 represent the CDFs of the packet processing times for execution paths within a normal distribution that is characterized by a normal range 710 of packet processing times. The curve 715 represents the CDF of a packet processing time for an anomalous execution path within an anomalous distribution. The curve 715 is identified as anomalous because the CDF of the packet processing time for the anomalous execution path falls outside of the normal range 710. For example, the normal range extends to approximately 1 ms, whereas the packet processing time for the anomalous execution path is on the order of 100 ms. The anomalous execution path therefore includes a fault or malicious modification that introduces a path delay of approximately 100 ms.

Figure 8:
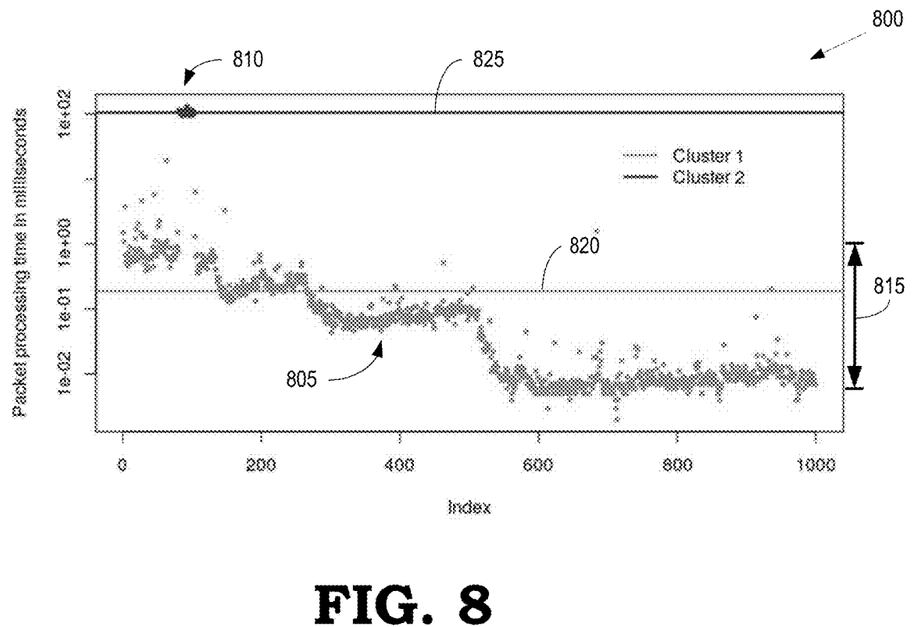
FIG. 8 is a 2-cluster plot of packet processing times as a function of index number of a corresponding sample according to some embodiments.

FIG. 8 is a 2-cluster plot 800 of packet processing times as a function of index number of a corresponding sample according to some embodiments. The vertical axis of the 2-cluster plot 800 indicates the packet processing time in milliseconds and the horizontal axis indicates the index of the sample. The 2-cluster plot 800 includes a first cluster 805 that includes samples corresponding to execution paths in a normal cluster and a second cluster 810 that includes samples corresponding to execution paths in an anomalous cluster. The first cluster 805 is associated with a normal range 815 of the packet processing time. A central value (e.g., mean, median, or mode) of the first cluster 805 is represented by the line 820 and a central value of the second cluster 810 is represented by the line 825.

Figure 9:
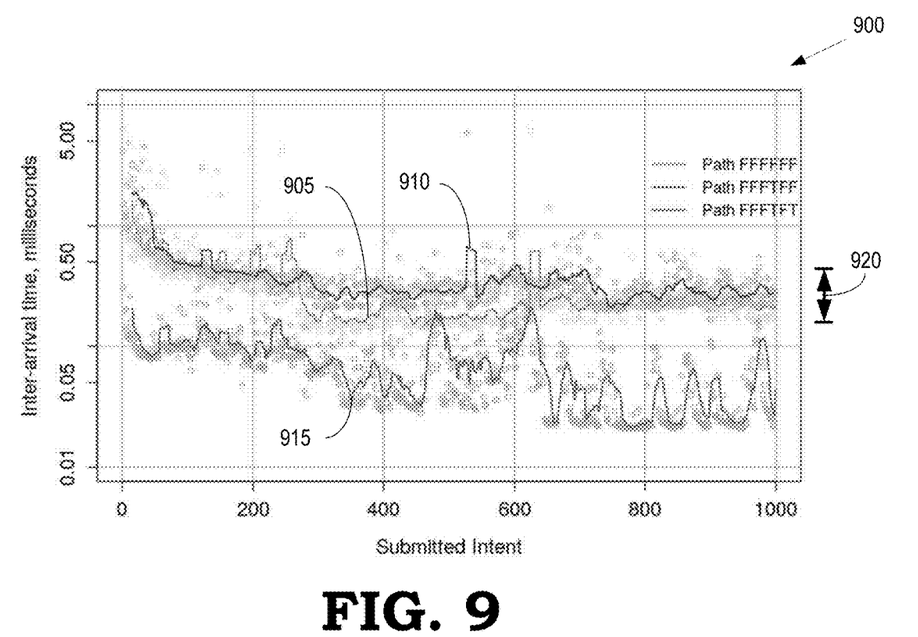
FIG. 9 is a plot of inter-arrival times (over a moving window) of intent submission requests generated by a malicious DoS variant of an event-driven application according to some embodiments.

FIG. 9 is a plot 900 of inter-arrival times (over a moving window) of intent submission requests generated by a malicious DoS variant of an event-driven application according to some embodiments. The vertical axis represents the packet inter-arrival time in milliseconds and the horizontal axis represents an index of the submitted intent request. Automated code verification based on model checking and unsupervised machine learning is performed on samples according to embodiments of the techniques disclosed herein. Three distributions of samples are identified: a first normal distribution 905, a second normal distribution 910, and an anomalous distribution 915. The normal distributions 905, 910 are characterized by a normal range 920 of the packet inter-arrival time. The anomalous distribution 915 is characterized by values of the packet inter-arrival time that are as much as two orders of magnitude smaller than typical values in the normal range 920. This indicates that the anomalous execution path producing the anomalous distribution 915 is associated with intent submission rates that are as much as two orders of magnitude higher than normal intent submission rates, which is characteristic of a DoS attack. The anomalous execution path has a path identifier of FFFTFT that represents the sequence of outcomes at branch points along the execution path. The path identifier can therefore be used to identify the execution path that generates the anomalous distribution 915, thereby allowing the potential DoS attack to be identified and thwarted.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
  executing, at a processor, an event-driven program along a plurality of execution paths, wherein each of the plurality of execution paths is determined by randomly chosen outcomes at non-deterministic points along the plurality of execution paths;
  storing, at a memory, values of properties of the event-driven program in response to executing the event-driven program along the plurality of execution paths; and
  inferring, at the processor, normal ranges of the properties of the event-driven program based on the stored values.

2. The method of claim 1, further comprising:
  randomly choosing the outcomes at the non-deterministic points from an equally weighted distribution of possible outcomes.

3. The method of claim 1, further comprising:
  randomly choosing the outcomes at the non-deterministic points from a differentially weighted distribution of possible outcomes.

4. The method of claim 3, further comprising:
  determining differential weights for the possible outcomes based on at least one of a priori knowledge of the outcomes or previous outcomes at the non-deterministic points during previous executions of the event-driven program.

5. The method of claim 1, further comprising:
  generating identifiers of the plurality of execution paths, wherein each identifier is generated based on the randomly chosen outcomes at the non-deterministic points along a corresponding one of the plurality of execution paths.

6. The method of claim 5, wherein generating each identifier comprises concatenating values representative of the randomly chosen outcomes on the corresponding one of the plurality of execution paths.

7. The method of claim 5, wherein storing the values of the properties of the event-driven program comprises storing the identifiers of the execution paths that generated the corresponding values of the properties.

8. The method of claim 5, further comprising:
  detecting an anomalous value by comparing values of the properties produced by an instance of the event-driven program to the inferred normal ranges of the properties.

9. The method of claim 8, further comprising:
  identifying an anomalous execution path of the event-driven program based on values of outcomes indicated by an identifier generated based on the outcomes at non-deterministic points along the anomalous execution path that produced the anomalous value.

10. An apparatus comprising:
  a processor configured to execute an event-driven program along a plurality of execution paths, wherein each of the plurality of execution paths is determined by randomly chosen outcomes at non-deterministic points along the plurality of execution paths; and
  a memory configured to store values of properties of the event-driven program in response to executing the event-driven program along the plurality of execution paths, and
  wherein the processor is configured to infer normal ranges of the properties of the event-driven program based on the values stored in the memory.

11. The apparatus of claim 10, wherein the processor is configured to randomly choose the randomly chosen outcomes from an equally weighted distribution of possible outcomes.

12. The apparatus of claim 10, wherein the processor is configured to randomly choose the randomly chosen outcomes from a differentially weighted distribution of possible outcomes.

13. The apparatus of claim 12, wherein the processor is configured to determine differential weights for the possible outcomes based on at least one of a priori knowledge of the outcomes or previous outcomes at the non-deterministic points during previous executions of the event-driven program.

14. The apparatus of claim 10, wherein the processor is configured to generate identifiers of the plurality of execution paths, wherein the processor is configured to generate each identifier based on the randomly chosen outcomes at the non-deterministic points along a corresponding one of the plurality of execution paths.

15. The apparatus of claim 14, wherein the processor is configured to concatenate values representative of the randomly chosen outcomes on the corresponding one of the plurality of execution paths.

16. The apparatus of claim 14, wherein the memory is configured to store the identifiers of the execution paths that generated the corresponding values of the properties.

17. The apparatus of claim 14, wherein the processor is configured to detect an anomalous value by comparing values of the properties produced by an instance of the event-driven program to the inferred normal ranges of the properties.

18. The apparatus of claim 17, wherein the processor is configured to identify an anomalous execution path of the event-driven program based on values of outcomes indicated by an identifier generated based on the outcomes at non-deterministic points along the anomalous execution path that produced the anomalous value.

19. A method, comprising:
  executing an event-driven program along an execution path defined by a plurality of outcomes at a plurality of non-deterministic points;
  comparing values of properties of the event-driven program executed along the execution path to a normal range of values of properties of the event-driven program, wherein the normal range is inferred from values of properties of the event-driven program executed along a plurality of execution paths that are determined by randomly chosen outcomes at non-deterministic points along the plurality of execution paths; and
  detecting an anomalous value in response to the comparison indicating a change between the values of the event-driven program executed along the execution path and the normal range of values of the properties.

20. The method of claim 19, further comprising:

determining, in response to detecting the anomalous value, the execution path of the event-driven program based on values of the plurality of outcomes indicated by an identifier generated based on the plurality of outcomes.

\* \* \* \* \*